(12) United States Patent
Bae et al.

(10) Patent No.: US 9,568,607 B2
(45) Date of Patent: Feb. 14, 2017

(54) DEPTH SENSOR AND METHOD OF OPERATING THE SAME

(71) Applicant: Samsung Electronics Co., Ltd., Suwon-si (KR)

(72) Inventors: Kwang Hyuk Bae, Seoul (KR); Kyu Min Kyung, Seoul (KR); Tae Chan Kim, Yongin-si (KR); Shung Han Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 357 days.

(21) Appl. No.: 14/150,361

(22) Filed: Jan. 8, 2014

(65) Prior Publication Data
US 2015/0130904 A1 May 14, 2015

(30) Foreign Application Priority Data
Nov. 12, 2013 (KR) .................. 10-2013-0137176

(51) Int. Cl.
| | | |
|---|---|---|
| H04N 13/02 | (2006.01) | |
| H04N 7/32 | (2006.01) | |
| G01S 17/89 | (2006.01) | |
| G01S 7/491 | (2006.01) | |

(52) U.S. Cl.
CPC ............ *G01S 17/89* (2013.01); *G01S 7/4915* (2013.01)

(58) Field of Classification Search
CPC ............ H04N 13/0207; H04N 13/0296; G01S 7/4915; G01S 17/89

USPC .......................................................... 348/46
See application file for complete search history.

(56) References Cited

U.S. PATENT DOCUMENTS

| | | | |
|---|---|---|---|
| 8,159,598 | B2 | 4/2012 | Watanabe et al. |
| 8,233,143 | B2 | 7/2012 | Cho et al. |
| 2009/0224750 | A1 | 9/2009 | Hosek et al. |
| 2011/0129123 | A1 | 6/2011 | Ovsiannikov et al. |
| 2011/0164132 | A1 | 7/2011 | Buettgen et al. |
| 2011/0202310 | A1 | 8/2011 | Min et al. |
| 2012/0133737 | A1 | 5/2012 | Min et al. |
| 2012/0134598 | A1 | 5/2012 | Ovsiannikov et al. |
| 2012/0173184 | A1 | 7/2012 | Ovsiannikov et al. |
| 2013/0101039 | A1* | 4/2013 | Florencio ............ H04N 19/176 375/240.16 |

FOREIGN PATENT DOCUMENTS

KR 1020100081197 A 7/2010

\* cited by examiner

*Primary Examiner* — Hee-Yong Kim
(74) *Attorney, Agent, or Firm* — Myers Bigel, P.A.

(57) ABSTRACT

A method of operating a depth sensor includes generating a first photo gate signal and second through fourth photo gate signals respectively having 90-, 180- and 270-degree phase differences from the first photo gate signal, applying the first photo gate signal and the third photo gate signal to a first row of a pixel array and the second photo gate signal and the fourth photo gate signal to a second row adjacent to the first row in a first frame using a first clock signal, and applying the first photo gate signal and the third photo gate signal to a first column of the pixel array and the second photo gate signal and the fourth photo gate signal to a second column adjacent to the first column in a second frame using a second clock signal.

19 Claims, 12 Drawing Sheets

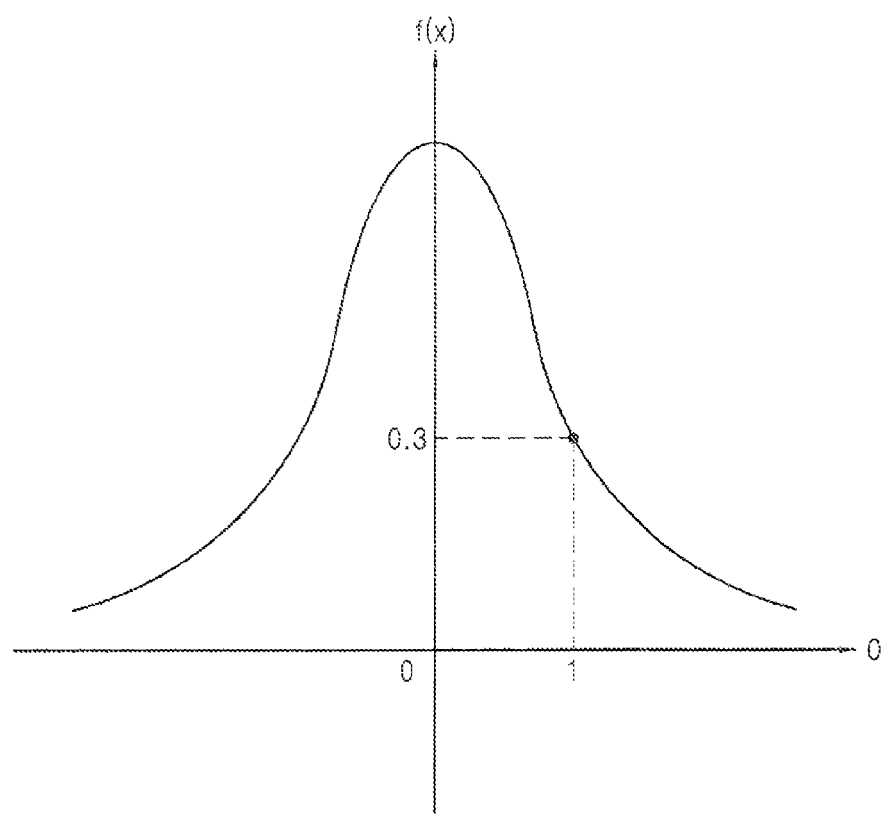

DEPTH SENSOR AND METHOD OF OPERATING THE SAME

CROSS-REFERENCE TO RELATED APPLICATIONS

This application claims priority under 35 U.S.C. §119(a) from Korean Patent Application No. 10-2013-0137176 filed on Nov. 12, 2013, the disclosure of which is hereby incorporated by reference in its entirety.

BACKGROUND

Embodiments of the inventive concept relate to a depth sensor and a method of operating the same, and more particularly, to a depth sensor for acquiring image data with noise minimized and a method of operating the same.

With the rapid increase of demand for smart phones, there has been a lot of development of image sensors. Image sensors include a plurality of pixels converting photons in a predetermined spectrum band into electrons.

Information about the depth between an object and an image sensor as well as information about color may be necessary to obtain a three-dimensional (3D) image. Methods of obtaining the information about the depth between the object and the image sensor may be divided into two types: active methods and passive methods.

A time-of-flight (TOF) method and a triangulation method are representative active methods. In the TOF method, modulated light is emitted to an object, light reflected from the object is sensed, and the depth is calculated from a phase change. In the triangulation method, the position of light emitted by a laser or the like in a certain distance from a sensor and the position of reflected light are sensed and the depth is calculated using triangulation. In the passive methods, the depth is calculated using only image information without emitting light. A stereo camera may be representative of the passive methods.

SUMMARY

According to some embodiments of the inventive concept, there is provided a method of operating a depth sensor. The method includes generating a first photo gate signal and second through fourth photo gate signals respectively having 90-, 180- and 270-degree phase differences from the first photo gate signal; applying the first photo gate signal and the third photo gate signal to a first row of a pixel array and the second photo gate signal and the fourth photo gate signal to a second row adjacent to the first row in a first frame using a first clock signal; and applying the first photo gate signal and the third photo gate signal to a first column of the pixel array and the second photo gate signal and the fourth photo gate signal to a second column adjacent to the first column in a second frame using a second clock signal. A frequency of the first clock signal may be different from a frequency of the second clock signal.

The method may further include interpolating pixel signals output from respective pixels included in the pixel array and generating image data based on interpolated pixel signals.

The interpolating the pixel signals may include interpolating a pixel signal of a first pixel in the first row based on a pixel signal of at least one second pixel in the second row in the first frame and interpolating the pixel signal of the second pixel in the second row based on a pixel signal of at least one first pixel in the first row in the first frame.

The interpolating the pixel signal of the first pixel in the first row based on the pixel signal of the at least one second pixel in the second row may include applying a weight corresponding to an offset of each of the at least one second pixel to the pixel signal of each at least one second pixel. The interpolating the pixel signal of the second pixel in the second row based on the pixel signal of the at least one first pixel in the first row may include applying a weight corresponding to an offset of each of the at least one first pixel to the pixel signal of each at least one first pixel.

The weight may be calculated based on a Gaussian function.

The interpolating the pixel signals may further include interpolating the pixel signal of the first pixel in the first column based on the pixel signal of the at least one second pixel in the second column in the second frame and interpolating the pixel signal of the second pixel in the second column based on the pixel signal of the at least one first pixel in the first column in the second frame.

The interpolating the pixel signal of the first pixel in the first column based on the pixel signal of the at least one second pixel in the second column may include applying a weight corresponding to an offset of each of the at least one second pixel to the pixel signal of each at least one second pixel. The interpolating the pixel signal of the second pixel in the second column based on the pixel signal of the at least one first pixel in the first column may include applying a weight corresponding to an offset of each of the at least one first pixel to the pixel signal of each at least one first pixel.

The weight may be calculated based on a Gaussian function.

According to other embodiments of the inventive concept, there is provided a depth sensor including a photo gate signal generator configured to generate a first photo gate signal and second through fourth photo gate signals respectively having 90-, 180- and 270-degree phase differences from the first photo gate signal; and a row and column selector configured to apply the first through fourth photo gate signals to rows or columns of a pixel array. The row and column selector applies the first photo gate signal and the third photo gate signal to a first row of the pixel array and the second photo gate signal and the fourth photo gate signal to a second row adjacent to the first row in a first frame using a first clock signal and applies the first photo gate signal and the third photo gate signal to a first column of the pixel array and the second photo gate signal and the fourth photo gate signal to a second column adjacent to the first column in a second frame using a second clock signal. A frequency of the first clock signal may be different from a frequency of the second clock signal.

The depth sensor may further include an image signal processor configured to interpolate pixel signals output from respective pixels included in the pixel array and to generate image data based on interpolated pixel signals.

The image signal processor may interpolate a pixel signal of a first pixel in the first row based on a pixel signal of at least one second pixel in the second row in the first frame and may interpolate the pixel signal of the second pixel in the second row based on a pixel signal of at least one first pixel in the first row in the first frame.

The image signal processor may apply a weight corresponding to an offset of each of the at least one second pixel to the pixel signal of each at least one second pixel when interpolating the pixel signal of the first pixel in the first row based on the pixel signal of the at least one second pixel in the second row and may apply a weight corresponding to an offset of each of the at least one first pixel to the pixel signal of each at least one first pixel when interpolating the pixel signal of the second pixel in the second row based on the pixel signal of the at least one first pixel in the first row.

The image signal processor may interpolate the pixel signal of the first pixel in the first column based on the pixel signal of the at least one second pixel in the second column in the second frame and may interpolate the pixel signal of the second pixel in the second column based on the pixel signal of the at least one first pixel in the first column in the second frame.

The image signal processor may apply a weight corresponding to an offset of each of the at least one second pixel to the pixel signal of each at least one second pixel when interpolating the pixel signal of the first pixel in the first column based on the pixel signal of the at least one second pixel in the second column and may apply a weight corresponding to an offset of each of the at least one first pixel to the pixel signal of each at least one first pixel when interpolating the pixel signal of the second pixel in the second column based on the pixel signal of the at least one first pixel in the first column.

The weight may be calculated based on a Gaussian function.

According to some embodiments, a method of operating a depth sensor may include interpolating pixel signals output from pixels of first and second adjacent rows of a pixel array in a first frame and interpolating pixel signals output from first and second adjacent columns of the pixel array in a second frame. The pixel signals of the first frame may be generated using a first clock signal and the pixel signals of the second frame may be generated using a second clock signal different than the first clock signal. The method may also include generating image data based on the interpolated pixel signals.

The pixel signals of the first row may be generated by a first pair of photo gate signals out of phase with each other and the pixel signals of the second row are generated by a second pair of photo gate signals out of phase with each other. The pixel signals of the first column may be generated by the first pair of photo gate signals and the pixel signals of the second column may be generated by the second pair of photo gate signals.

The pixel signals of the first frame and the pixel signals of the second frame may each be generated by first, second, third and fourth photo gate signals. The second, third and fourth photo gate signals may respectively have 90-, 180- and 270-degree phase differences from the first photo gate signal. The first and third photo gate signals may be applied to the first row and first column and the second and fourth photo gate signals may be applied to the second row and second column.

The method may further include interpolating a pixel signal of a first pixel in the first row based on a pixel signal of a second pixel in the second row, interpolating the pixel signal of the second pixel in the second row based on a pixel signal of the first pixel in the first row, interpolating a pixel signal of a first pixel in the first column based on a pixel signal of a second pixel in the second column and interpolating the pixel signal of the second pixel in the second column based on the pixel signal of the first pixel in the first column.

The method may also include applying a weight corresponding to a reflected signal offset of the second pixel to the pixel signal of the second pixel, applying a weight corresponding to a reflected signal offset of the first pixel to the pixel signal of the first pixel, applying a weight corresponding to a reflected signal offset of the second pixel to the pixel signal of the second pixel and/or applying a weight corresponding to a reflected signal offset of the first pixel to the pixel signal of the first pixel.

BRIEF DESCRIPTION OF THE DRAWINGS

The above and other features and advantages of the inventive concept will become more apparent by describing in detail exemplary embodiments thereof with reference to the attached drawings in which:

FIGS. 9A and 9B are diagrams illustrating a weight function used in interpolating pixel signals;

DETAILED DESCRIPTION

Figure 1:
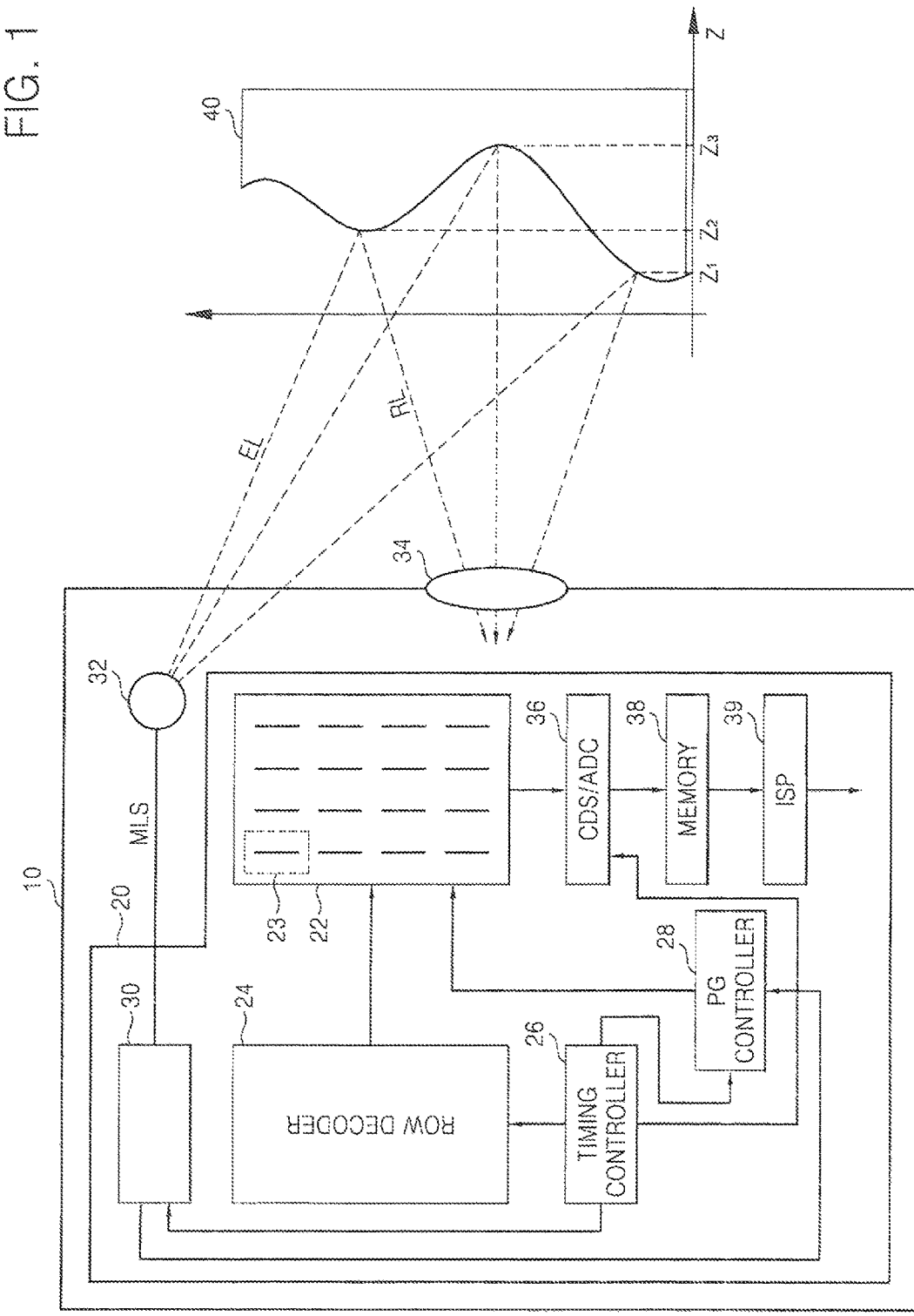
FIG. 1 is a block diagram of a depth sensor according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
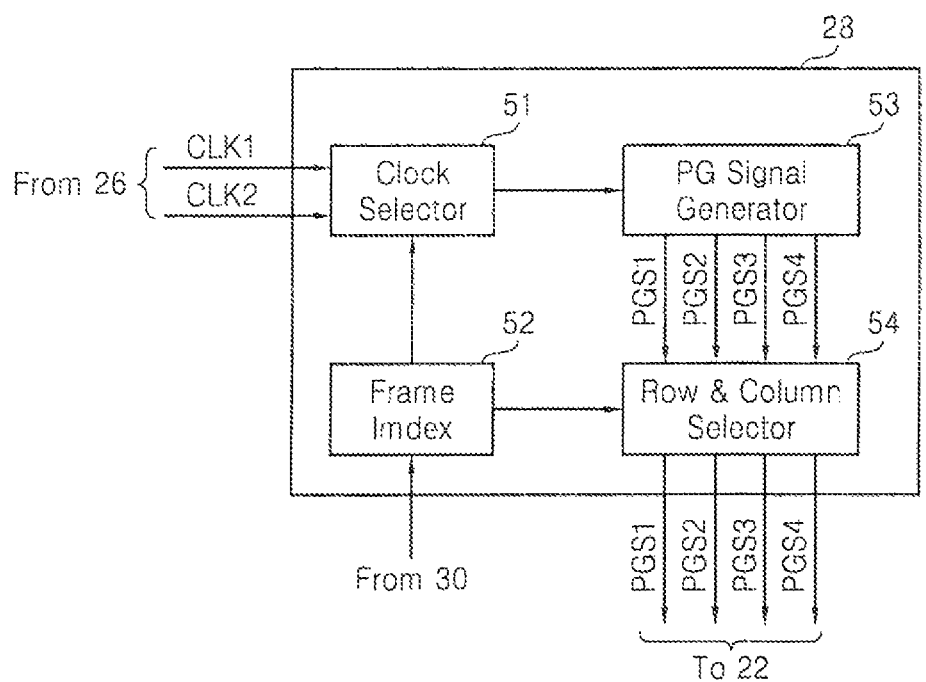
FIG. 2 is a detailed block diagram of a photo gate controller illustrated in FIG. 1.
Figure 3:
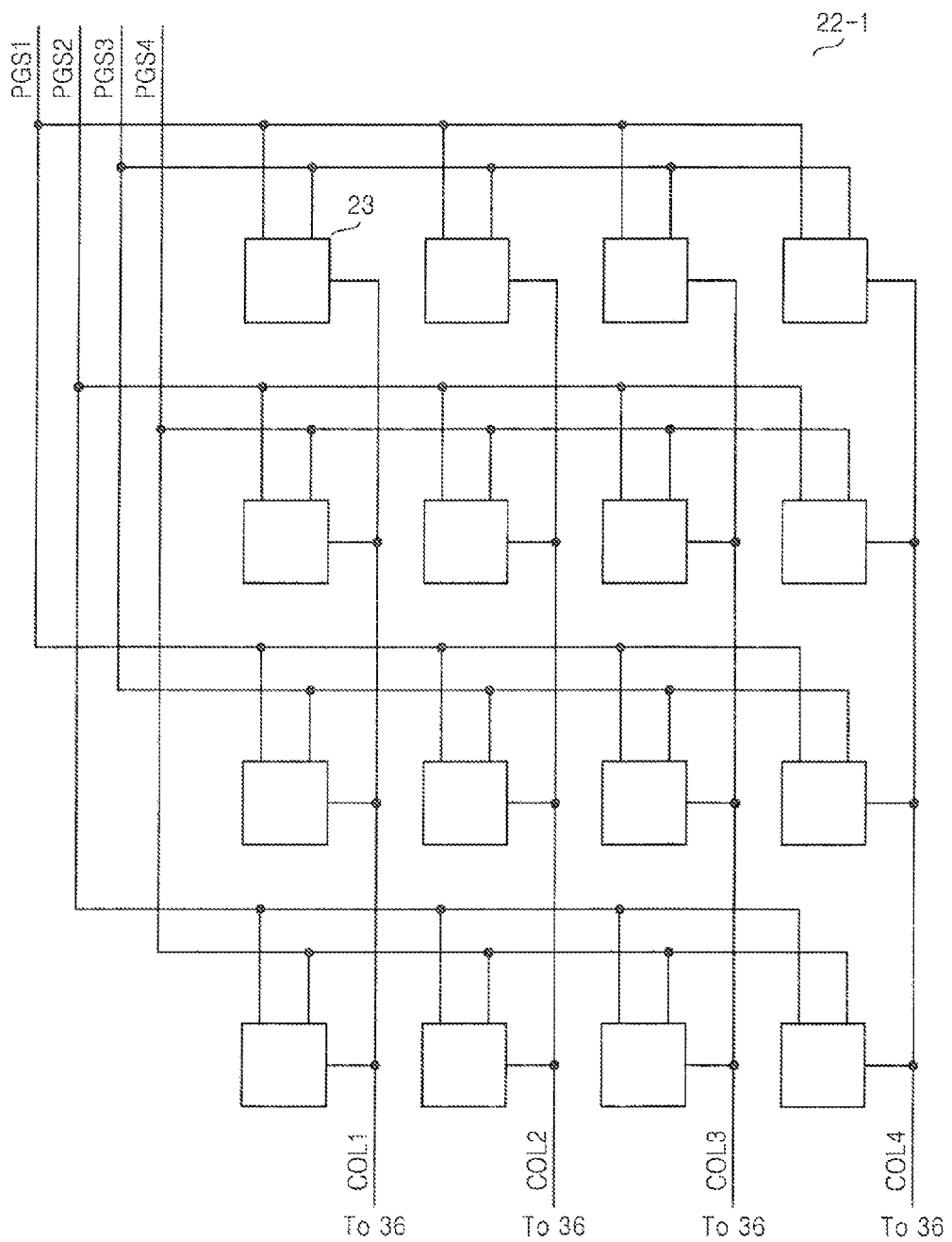
FIG. 3 is a diagram for explaining the operation of the photo gate controller illustrated in FIG. 1 during a first frame.
Figure 4:
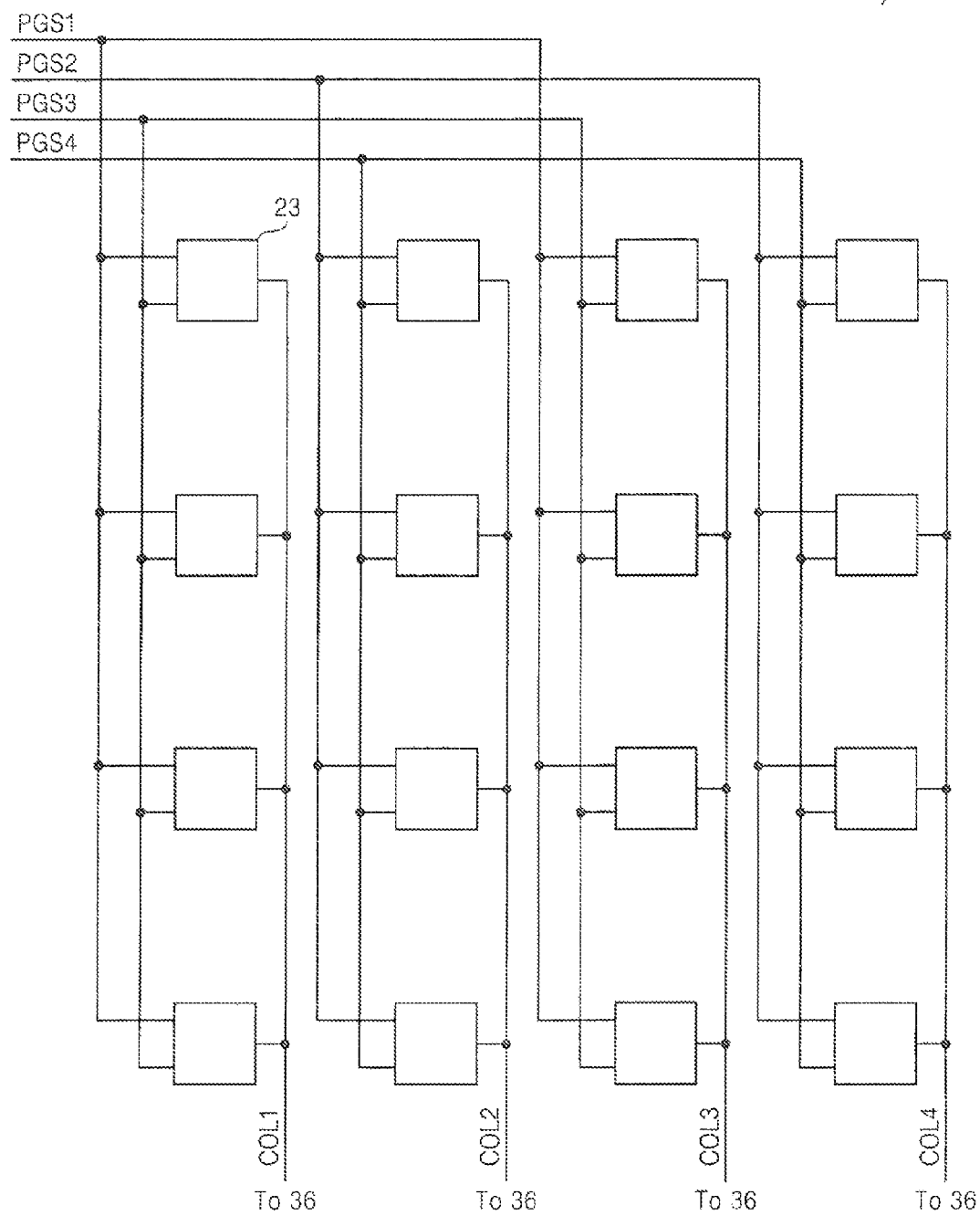
FIG. 4 is a diagram for explaining the operation of the photo gate controller illustrated in FIG. 1 during a second frame.
Figure 5:
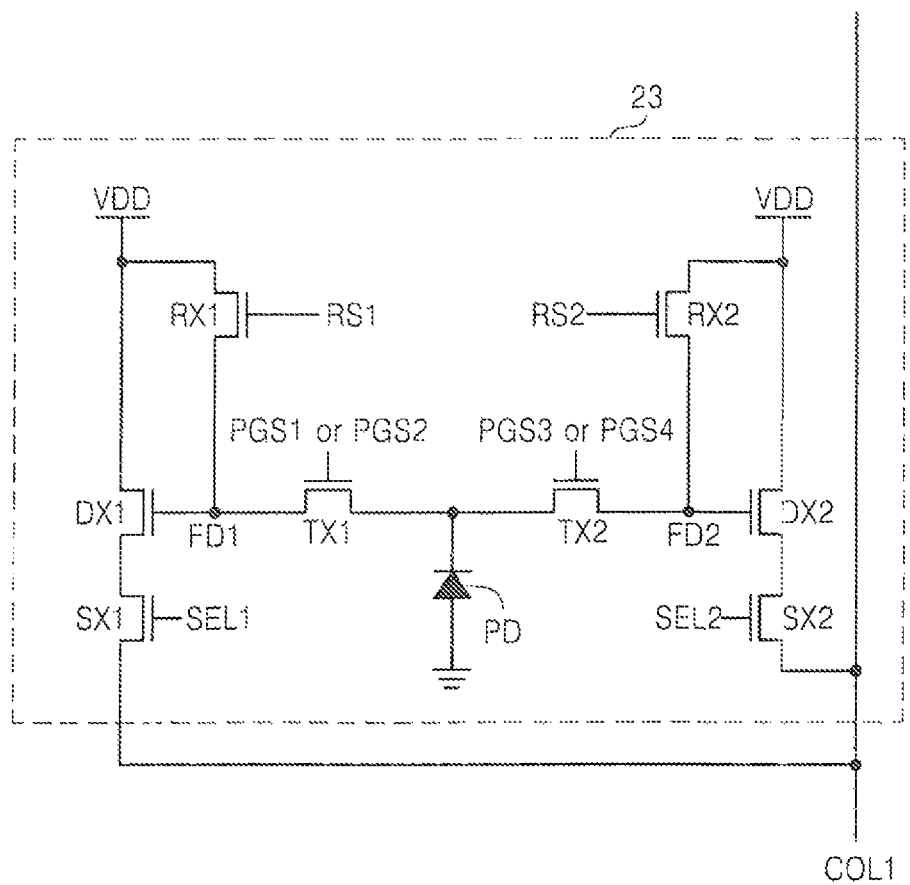
FIG. 5 is a circuit diagram of a 2-tap depth pixel in a pixel array illustrated in FIG. 1.
Figure 6:
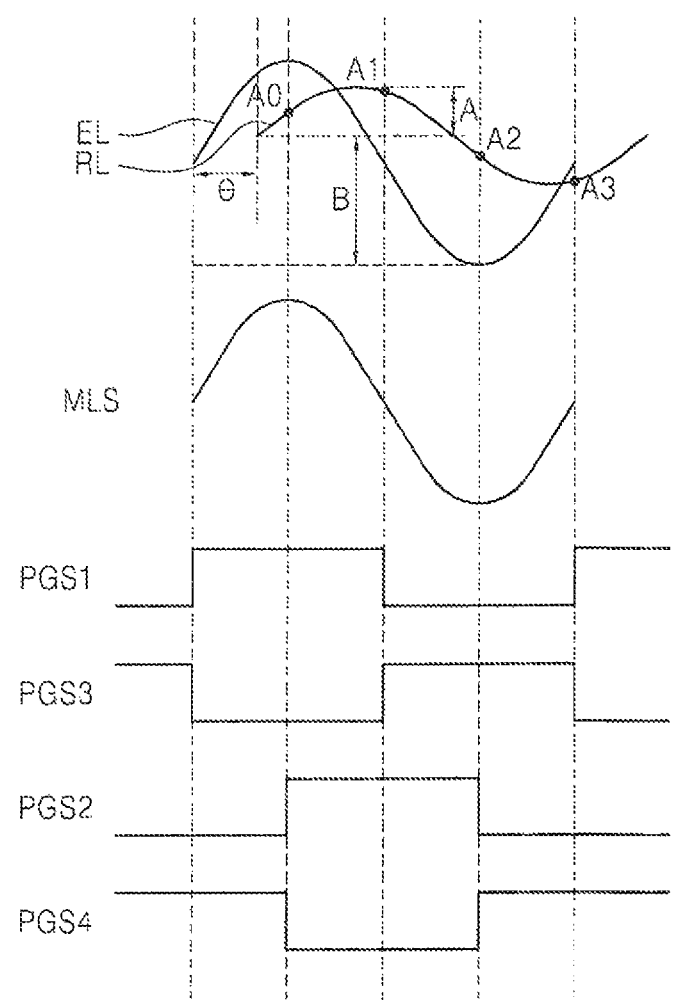
FIG. 6 is a timing chart showing the operation of the 2-tap depth pixel illustrated in FIG. 5.

Since depth information may include noise due to various factors, it is desired to minimize the noise to acquire accurate information. FIG. 1 is a block diagram of a depth sensor 10 according to some embodiments of the inventive concept. FIG. 2 is a detailed block diagram of a photo gate (PG) controller 28 illustrated in FIG. 1. FIG. 3 is a diagram for explaining the operation of the PG controller 28 illustrated in FIG. 1 during a first frame. FIG. 4 is a diagram for explaining the operation of the PG controller 28 illustrated in FIG. 1 during a second frame. FIG. 5 is a circuit diagram of a 2-tap depth pixel 23 in a pixel array 22 illustrated in FIG. 1. FIG. 6 is a timing chart showing the operation of the 2-tap depth pixel 23 illustrated in FIG. 5.

Referring to FIGS. 1 through 6, the depth sensor 10 that can measure a distance or a depth using a time of flight (TOF) principle includes a semiconductor chip 20 including a pixel array 22 in which plural depth pixels (i.e., detectors or sensors) 23 are arranged, a light source 32, and a lens module 34. The depth pixels 23 may be implemented in 2-tap architecture illustrated in FIG. 5. The 2-tap architecture enables image data to be obtained with less number of sampling operations than 1-tap architecture and provides a higher fill factor than 4-tap architecture.

The depth sensor 10 may be implemented as part of an image sensor (not shown) that generates a three-dimensional (3D) image using a color image and a depth image.

The depth pixels 23 implemented in the pixel array 22 in two dimensions include transfer gates, e.g., TX1 and TX2 in FIG. 5. The depth pixels 23 also include a plurality of transistors for signal processing.

A row decoder 24 selects one row from among a plurality of rows in response to a row address output from a timing controller 26. Here, a row is a set of depth pixels arranged in a horizontal direction in the pixel array 22.

The PG controller 28 may generate a plurality of PG signals PGS1 through PGS4 and provide them to the pixel array 22 under the control of the timing controller 26. As shown in FIG. 2, the PG controller 28 may include a clock selector 51, a frame index 52, a PG signal generator 53, and a row and column selector 54.

The clock selector 51 may select and output one of a first clock signal CLK1 and a second clock signal CLK2, which are output from the timing controller 26, according to the control of the frame index 52. The first and second clock signals CLK1 and CLK2 have a first frequency and a second frequency, respectively. The first frequency may be different from the second frequency. For instance, the clock selector 51 may select and output the first clock signal CLK1 during an odd-numbered frame and may select and output the second clock signal CLK2 during an even-numbered frame. In other embodiments, the clock selector 51 may output a clock signal (either of the first and second clock signals CLK1 and CLK2) having the same frequency in all frames.

The frame index 52 may receive a clock signal MLS for driving the light source 32 from a light source driver 30. The frame index 52 may determine whether a current frame is an odd-numbered frame or an even-numbered frame according to the clock signal MLS. The frame index 52 may control the clock selector 51 and the row and column selector 54 according to the determination result.

The PG signal generator 53 may receive one of the first and second clock signals CLK1 and CLK2 and generate the first PG signals PGS1 and second through fourth PG signals PGS2 through PGS4 which respectively have 90-, 180-, and 270-degree phase differences from the first PG signal PGS1. In other words, the PG signal generator 53 generates the first PG signals PGS1 having the same phase as the clock signal MLS and the third PG signal PGS3 having a 180-degree phase difference from the clock signal MLS. Also, the PG signal generator 53 generates the second PG signals PGS2 having a 90-degree phase difference from the clock signal MLS and the fourth PG signal PGS4 having a 270-degree phase difference from the clock signal MLS. The frequency of the first through fourth PG signals PGS1 through PGS4 generated during a first frame may be different from or the same as that generated during a second frame.

The row and column selector 54 may apply the first through fourth PG signals PGS1 through PGS4 to rows or columns in the pixel array 22 according to the control of the frame index 52.

FIGS. 3 and 4 show methods of the row and column selector 54 applying the PG signals PGS1 through PGS4 to part of the pixel array 22. The part of the pixel array 22 includes 16 depth pixels 23 arranged in a matrix with four rows and four columns. For clarity of the description, only the part of the pixel array 22, which includes four rows and four columns, is described, but all rows and columns included in the pixel array 22 may operate in the same manner and the numbers of rows and columns are not limited.

FIG. 3 shows a connection state 22-1 between the row and column selector 54 and the pixel array 22 during a first frame (or an odd-numbered frame). A frame is a time taken for a cycle of photocharge integration, pixel signal generation, and read-out to be completed with respect to the entire pixel array 22.

During the first frame, the row and column selector 54 applies the same PG signal to each of the rows. In other words, during the first frame, the row and column selector 54 may apply the first PG signals PGS1 and the third PG signal PGS3 to odd-numbered rows of the pixel array 22 and may apply the second PG signals PGS2 and the fourth PG signal PGS4 to even-numbered rows of the pixel array 22.

FIG. 4 shows a connection state 22-2 between the row and column selector 54 and the pixel array 22 during a second frame (or an even-numbered frame). During the second frame, the row and column selector 54 applies the same PG signal to each of the columns. In other words, during the second frame, the row and column selector 54 may apply the first PG signals PGS1 and the third PG signal PGS3 to odd-numbered columns of the pixel array 22 and may apply the second PG signals PGS2 and the fourth PG signal PGS4 to even-numbered columns of the pixel array 22.

The row and column selector 54 may include a plurality of switching units as many as the number of rows or columns to switch between the connection states 22-1 and 22-2 respectively illustrated in FIGS. 3 and 4 whenever a frame changes.

The PG signal generator 53 generates the PG signals PGS1 through PGS4 based on the first clock signal CLK1 during the first frame, so that image data based on pixel signals generated by the depth pixels 23 has a maximum measurement distance depending on the frequency of the first clock signal CLK1. For instance, when the frequency of the first clock signal CLK1 is 20 MHz, the maximum measurement distance is set to 7.5 m.

The PG signal generator 53 generates the PG signals PGS1 through PGS4 based on the second clock signal CLK2 during the second frame, so that image data based on pixel signals generated by the depth pixels 23 has a maximum measurement distance depending on the frequency of the second clock signal CLK2. For instance, when the frequency of the second clock signal CLK2 is 30 MHz, the maximum measurement distance is set to 5 m.

When the image data based on the first clock signal CLK1 having a frequency of 20 MHz giving a maximum measurement distance of 7.5 m during the first frame is mixed with image data based on the second clock signal CLK2 having a frequency of 30 MHz giving a maximum measurement distance of 5 m during the second frame, a maximum distance represented by two frames is 30 m, i.e., a common multiple of the two maximum measurement distances.

When the depth pixels 23 have the 2-tap architecture, two frames are basically required to generate a depth image corresponding to the pixel array 22. However, when pseudo 4-tap scheme is used, a depth image can be generated with only one frame. In order to generate complete depth information using a single depth pixel 23, a pixel signal generated by four PG signals respectively having different phases is required. Since the depth pixel 23 has the 2-tap architecture for a single frame, it generates a pixel signal from two PG signals respectively having different phases. According to the pseudo 4-tap scheme, a result of interpolating a pixel signal generated by another depth pixel 23 that is adjacent to the current depth pixel 23 and receives two other PG signals respectively having different phases is used as a pixel signal generated by the current depth pixel 23 from the two other PG signals.

When image data is formed with only pixel signals generated for the first frame using the pseudo 4-tap scheme, spatial resolution decreases in a vertical direction. This is because a result of interpolating pixel signals adjacent to each other in the vertical direction is used. Accordingly, the spatial resolution is decreased as compared to when pixel signals generated from four PG signals respectively having different phases are used during two frames. Pseudo 4-tap pixel architecture, as described in embodiments herein, may use different modulation signals for different row pixels. While faster data acquisition may reduce motion artifacts, depth calculation with two vertical pixels may lower depth resolution. Reflected signal offset values may be used for similarity weights to improve depth resolution. Experimental results may show that edge artifact is improved in the vertical direction. Embodiments of the pseudo 4-tap architecture and experimental results may be shown in a 2013 IEEE International Conference on Consumer Electronics (ICCE) paper titled, "*Interpolation Method for ToF Depth Sensor with Psuedo 4-tap Pixel Architecture*," by Tae-Chan Kim, Kwanghyuk Bae, Kyu-Min Kyung and Shung Han Cho, which is incorporated herein by reference in its entirety.

Similarly, when image data is formed using pixel signals only generated for the second frame, spatial resolution decreases in the horizontal direction.

An image signal processor (ISP) 39 generates new image data by mixing the image data of the first frame and the image data of the second frame, which are respectively generated based on the first and second clock signals CLK1 and CLK2 respectively having different frequencies (i.e., a multi-frequency clock signal), thereby preventing a repeated distance, i.e., an error occurring in depth information due to the limit to the maximum measurement distance. As a result, the depth information unrestricted by the maximum measurement distance is obtained.

In other embodiments, the maximum measurement distance may be increased using at least one more clock signal having a frequency different from the frequencies of the first and second clock signals CLK1 and CLK2.

The ISP 39 also generate the new image data by mixing the image data of the first frame, which is generated when the same PG signal is applied to each row, with the image data of the second frame, which is generated when the same PG signal is applied to each column, so that the depth information whose spatial resolution is not decreased in the horizontal or vertical direction is obtained. At this time, image data of a total of four frames are required to obtain image data generated based on two clock signals respectively having different frequencies or to obtain image data generated using different PG gate signals applied to rows or columns based on a single clock signal in the pixel array 22 including the 2-tap depth pixels 23. However, when the pseudo 4-tap scheme is used, image data of just two frames are required. As a result, motion lagging (i.e., an error occurring in the depth information when an image has fast movement) occurring when image data generated at different times are mixed is reduced.

The light source driver 30 may generate the clock signal MLS for driving the light source 32 under the control of the timing controller 26. The light source 32 emits a modulated optical signal EL to a scene 40 in response to the clock signal MLS. The scene 40 may be called an object or a target object. The modulated optical signal EL may have different amplitude according to the operation of the light source driver 30. The distance between the scene 40 and the depth sensor 10 may vary.

A light emitting diode (LED), an organic light emitting diode (OLED), an active-matrix OLED (AMOLED), or a laser diode may be used as the light source 32. The clock signal MLS or the modulated optical signal may be a sine wave or a square wave.

The light source driver 30 provides the clock signal MLS or information about the clock signal MLS to the PG controller 28.

The modulated optical signal EL output from the light source 32 is reflected from the scene 40. When there are different distances $Z_1$, $Z_2$, and $Z_3$ between the depth sensor 10 and the scene 40, a distance Z is calculated as follows. For instance, when the modulated optical signal EL is A cos ωt and a reflected optical signal RL input to the depth pixels 23 is A' cos(Ωt+θ)+B', a phase shift or phase difference θ by TOF is defined as Equation 1:

$$\theta = 2*\omega*Z/C = 2*(2\pi f)*Z/C, \qquad (1)$$

where C is the speed of light.

At this time, the depth pixels 23 means two depth pixels respectively included in two adjacent rows or columns in the first or second frame and it is assumed that two depth pixels receive the same reflected optical signal RL. For instance, the depth pixels 23 may be a depth pixel at the intersection between the first row and the first column and a depth pixel at the intersection between the second row and the first column in the first frame.

The distance Z from the light source 32 or the pixel array 22 to the scene 40 is calculated using Equation 2:

$$Z=\theta*C/(2*\omega)=\theta*C/(2*(2\pi f)). \tag{2}$$

The reflected optical signal RL is input to the pixel array 22 through the lens module 34. Here, the lens module 34 may include a lens and an infrared pass filter.

The depth sensor 10 includes a plurality of light sources arranged in circle around the lens module 34, but only one light source 32 is illustrated in FIG. 1 for clarity of the description.

The reflected optical signal RL input to the pixel array 22 through the lens module 34 may be demodulated through a single sampling operation. A 2-tap depth pixel basically requires two sampling operations. However, according to the embodiments of the inventive concept, pixel signals A0, A1, A2, and A3 are generated (or detected) by two depth pixels respectively included in adjacent rows or columns in the first or second frame, and therefore, only one sampling operation is required. A sampling operation is generating (or detecting) the pixel signal A0, A1, A2, or A3 from the reflected optical signal RL. The pixel signals A0, A1, A2, and A3 will be described in detail later.

The phase shift θ between the modulated optical signal EL and the reflected optical signal RL may also be defined as Equation 3:

$$\theta = \arctan\left(\frac{A3-A1}{A2-A0}\right). \tag{3}$$

Amplitude A of the reflected optical signal RL may be defined as Equation 4:

$$A = \frac{\sqrt{(A3-A1)^2 - (A0-A2)^2}}{2}. \tag{4}$$

The amplitude A of the reflected optical signal RL is determined by amplitude of the modulated optical signal EL. An offset B of the reflected optical signal RL may be defined as Equation 5:

$$B = \frac{A0+A2}{2} = \frac{A1+A3}{2}. \tag{5}$$

Each of the depth pixels 23 includes a single photo diode PD, two transfer transistors TX1 and TX2, tow reset transistors RX1 and RX2, two drive transistors DX1 and DX2, and two select transistors SX1 and SX2. In other embodiments, at least one of the reset transistors RX1 and RX2, the drive transistors DX1 and DX2, and the select transistors SX1 and SX2 may be omitted.

In operation of each depth pixel 23, the photo diode PD generates photocharge varying with the intensity of the reflected optical signal RL. The first transfer transistor TX1 may transmit the photocharge to a first floating diffusion node FD1 according to the first PG signal PGS1 or the second PG signal PGS2 output from the PG controller 28. The second transfer transistor TX2 may transmit the photocharge to a second floating diffusion node FD2 according to the third PG signal PGS3 or the fourth PG signal PGS4 output from the PG controller 28.

In detail, in a period while a PG signal applied to each of the first and second transfer transistors TX1 and TX2 among the first through fourth PG signals PGS1 through PGS4 is at a high level (e.g., 3.3 V), each transfer transistor TX1 or TX2 may transmit the photocharge to a corresponding one of the floating diffusion nodes FD1 and FD2. Contrarily, in a period while a PG signal applied to each of the first and second transfer transistors TX1 and TX2 among the first through fourth PG signals PGS1 through PGS4 is at a low level (e.g., 0 V), each transfer transistor TX1 or TX2 may not transmit the photocharge to a corresponding one of the floating diffusion nodes FD1 and FD2.

The first drive transistor DX1 may amplify and transmit the photocharge to the first select transistor SX1 according to a potential of the photocharge accumulated at the first floating diffusion node FD1. The second drive transistor DX2 may amplify and transmit the photocharge to the second select transistor SX2 according to a potential of the photocharge accumulated at the second floating diffusion node FD2.

A drain terminal of the first select transistor SX1 is connected with a source terminal of the first drive transistor DX1 and may output a pixel signal to a first column line COL1 in response to a first selection control signal SEL1 output from the PG controller 28. A drain terminal of the second select transistor SX2 is connected with a source terminal of the second drive transistor DX2 and may output a pixel signal to a second column line COL2 in response to a second selection control signal SEL2 output from the PG controller 28.

The first reset transistor RX1 may reset the first floating diffusion node FD1 to VDD according to a first reset signal RS1 output from the PG controller 28. The second reset transistor RX2 may reset the second floating diffusion node FD2 to VDD according to a second reset signal RS2 output from the PG controller 28.

In other embodiments, the row driver 24 may generate a plurality of the control signals RS1, RS2, SEL1, and SEL2 applied to the depth pixels 23 under the control of the timing controller 26.

Each depth pixel 23 accumulates photocharge for a predetermined time, e.g., an integration time and outputs the pixel signals A0, A1, A2, and A3 generated according to the accumulation result. Referring to FIG. 1, under the control of the timing controller 26, a correlated double sampling (CDS)/analog-to-digital converter (ADC) circuit 36 performs CDS and analog-to-digital conversion on the pixel signals A0, A1, A2, and A3 output from the depth pixel 23 and outputs digital pixel signals. The depth sensor 10 illustrated in FIG. 1 may also include active load circuits (not shown) that transmit a pixel signal output from each of a plurality of column lines in the pixel array 22 to the CDS/ADC circuit 36.

A memory 38 may be implemented as a buffer. The memory 38 receives and stores the digital pixel signals output from the CDS/ADC circuit 36.

The depth sensor 10 may also include the ISP 39. The ISP 39 may process the pixel signals A0, A1, A2, and A3 output from the memory 38 and may calculate distance information or depth information. The ISP 39 may be implemented in the semiconductor chip 20. In other embodiments, the ISP 39 may be implemented in the outside the semiconductor chip 20 or the outside of the depth sensor 10.

Figure 7:
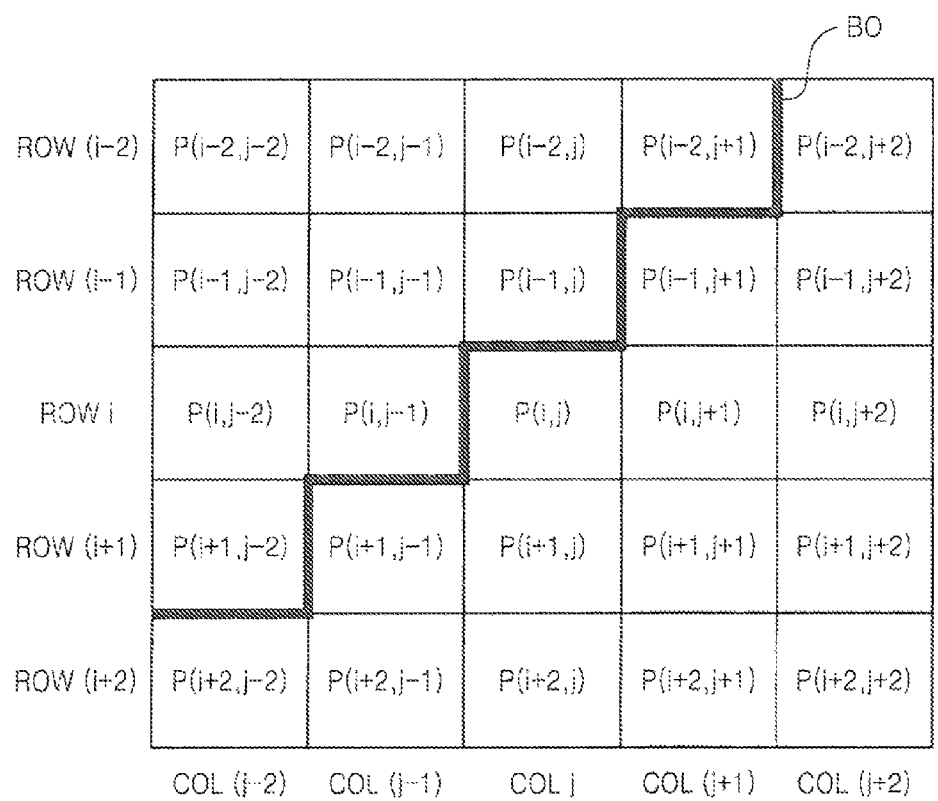
FIG. 7 is a diagram for explaining a method of interpolating pixel signals output from the pixel array illustrated in FIG. 1 using a pseudo 4-tap scheme according to some embodiments of the inventive concept.
Figure 8:
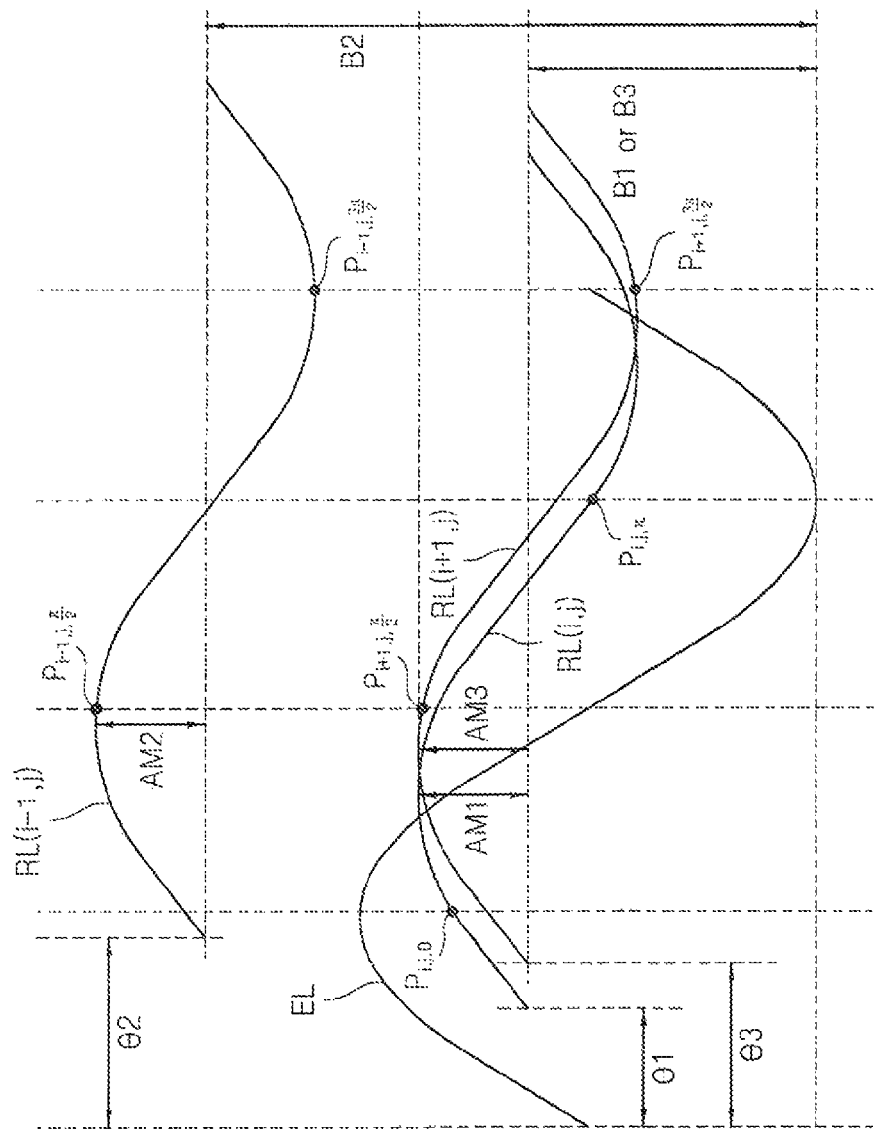
FIG. 8 is a diagram illustrating reflected optical signals input to some of pixels illustrated in FIG. 7.
Figure 9B:
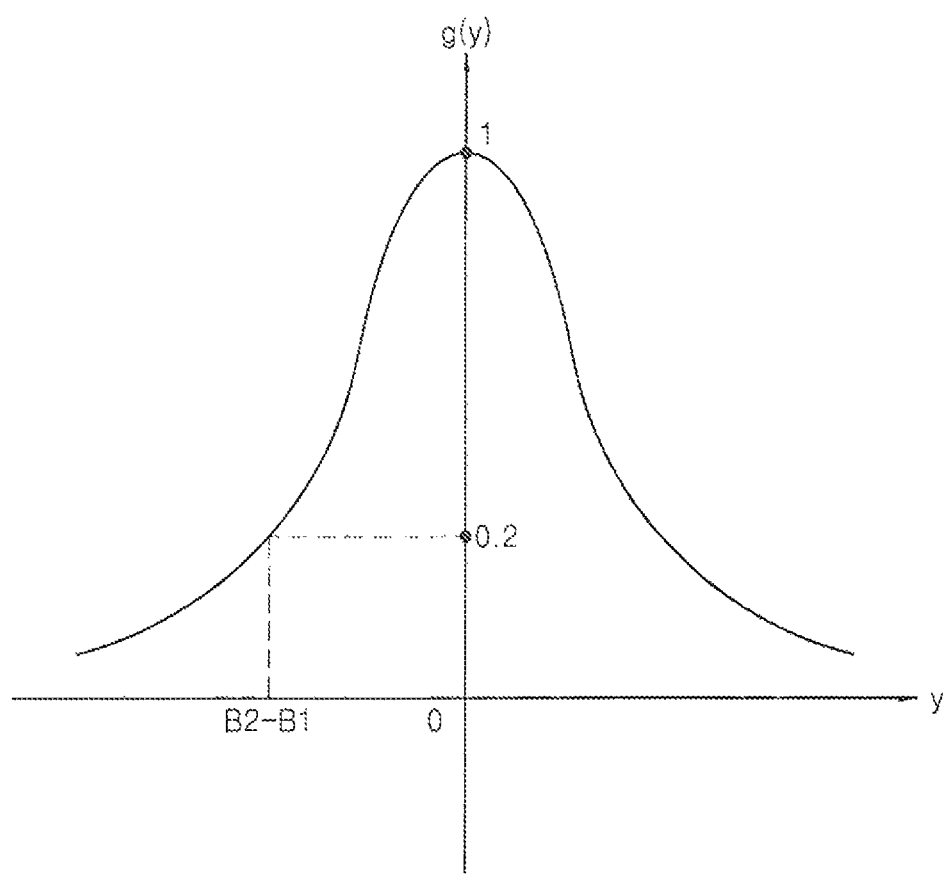

FIG. 7 is a diagram for explaining a method of interpolating pixel signals output from the pixel array 22 illustrated in FIG. 1 using the pseudo 4-tap scheme according to some embodiments of the inventive concept. FIG. 8 is a diagram illustrating reflected optical signals RLs input to some of pixels illustrated in FIG. 7. FIGS. 9A and 9B are diagrams illustrating a weight function used in interpolating the pixel signals.

Referring to FIGS. 1 through 9B, FIG. 7 shows 25 pixels arranged in a matrix. Although only 25 pixels are illustrated in the current embodiments for clarity of the description, the scope of the inventive concept is not restricted to the current embodiments. A pixel P(i,j) is a pixel positioned at the intersection between an i-th row and a j-th column.

As illustrated in FIGS. 3 and 4, the first PG signal PGS1 and the third PG signal PGS3 are applied to the (i−2)-th row, the i-th row, and the (i+2)-th row and the second PG signal PGS2 and the fourth PG signal PGS4 are applied to the (i−1)-th row and the (i+1)-th row in the first frame. The first PG signal PGS1 and the third PG signal PGS3 are applied to the (j−2)-th column, the j-th column, and the (j+2)-th column and the second PG signal PGS2 and the fourth PG signal PGS4 are applied to the (j−1)-th column and the (j+1)-th column in the second frame.

As described above with reference to FIGS. 5 and 6, interpolation is performed using the pixel signals A0 and A2 or A1 and A3 generated by a current depth pixel 23 in the first or second frame and pixel signals of adjacent depth pixels 23 of the current depth pixel 23 and image data respectively generated in the two frames are mixed with each other, so that image data whose spatial resolution is not decreased in the vertical or horizontal direction is obtained. The ISP 39 may interpolate a pixel signal of the pixel P(i,j) using pixel signals of pixels included in the (i−1)-th row and pixel signals of pixels included in the (i+1)-th row in the 5×5 matrix during the first frame because the (i−1)-th row and the (i+1)-th row receive PG signals having a different phase from a PG signal applied to the pixel P(i,j). Similarly, the ISP 39 may interpolate the pixel signal of the pixel P(i,j) using pixel signals of pixels included in the (j−1)-th column and pixel signals of pixels included in the (j+1)-th column in the 5×5 matrix during the second frame because the (j−1)-th column and the (j+1)-th column receive PG signals having a different phase from a PG signal applied to the pixel P(i,j).

In other words, when pixels receiving the first PG signal PGS1 and the third PG signal PGS3 in each frame are defined as first pixels and pixels receiving the second PG signal PGS2 and the fourth PG signal PGS4 in each frame are defined as second pixels, a pixel signal of a first pixel may be interpolated using pixel signals of adjacent second pixels and a pixel signal of a second pixel may be interpolated using pixel signals of adjacent first pixels.

For clarity of the description, a case where the ISP 39 interpolates the pixel signal of the pixel P(i,j) using a pixel signal of a pixel P(i−1,j) and a pixel signal of a pixel P(i+1,j) in the first frame will be described. However, the scope of the inventive concept is not restricted to this case and the number or positions of pixels used for interpolation are not restricted.

The pixel signal of the pixel P(i,j) includes $P_{i,j,0}$ and $P_{i,j,\pi}$ respectively generated based on the first PG signal PGS1 and the third PG signal PGS3. $P_{i,j,0}$ and $P_{i,j,\pi}$ are respectively defined as Equations 6 and 7:

$$P_{i,j,0}=AM1\cos\theta1+B1, \text{ and} \qquad (6)$$

$$P_{i,j,\pi}=AM1\cos(\theta1+\pi)+B1=-AM1\cos\theta1+B1, \qquad (7)$$

where AM1, θ1, and B1 are the amplitude, phase shift, and offset, respectively, of a reflected optical signal RL(i,j).

The pixel signal of the pixel P(i−1,j) includes $P_{i-1,j,\pi/2}$ and $P_{i-1,j,3\pi/2}$ respectively generated based on the first PG signal PGS1 and the third PG signal PGS3 and the pixel signal of the pixel P(i+1,j) includes $P_{i+1,j,\pi/2}$ and $P_{i+1,j,3\pi/2}$ respectively generated based on the first PG signal PGS1 and the third PG signal PGS3. $P_{i-1,j,\pi/2}$, $P_{i-1,j,3\pi/2}$, $P_{i+1,j,\pi/2}$, and $P_{i+1,j,3\pi/2}$ are respectively defined as Equations 8 through 11:

$$P_{i-1,j,\frac{\pi}{2}} = AM2\cos\left(\theta2 + \frac{\pi}{2}\right) + B2 = AM2\sin\theta2 + B2, \qquad (8)$$

$$P_{i-1,j,\frac{3\pi}{2}} = AM2\cos\left(\theta2 + \frac{3\pi}{2}\right) + B2 = -AM2\sin\theta2 + B2, \qquad (9)$$

$$P_{i+1,j,\frac{\pi}{2}} = AM3\cos\left(\theta3 + \frac{\pi}{2}\right) + B3 = AM3\sin\theta3 + B3, \text{ and} \qquad (10)$$

$$P_{i+1,j,\frac{3\pi}{2}} = AM3\cos\left(\theta3 + \frac{3\pi}{2}\right) + B3 = -AM3\sin\theta3 + B3, \qquad (11)$$

where AM2, θ2, and B2 are the amplitude, phase shift, and offset, respectively, of a reflected optical signal RL(i−1,j) and AM3, θ3, and B3 are the amplitude, phase shift, and offset, respectively, of a reflected optical signal RL(i+1,j).

The offsets B2 and B3 are easily obtained by averaging $P_{i-1,j,\pi/2}$ and $P_{i-1,j,3\pi/2}$ and averaging $P_{i+1,j,\pi/2}$ and $P_{i+1,j,3\pi/2}$. It is assumed that the offset sets of reflected optical signals input to pixels on the upper left of a border BO in FIG. 7 are the same as one another and that the offsets of reflected optical signals input to pixels on the lower right of the border BO are the same as one another but are lower than the offsets of the reflected optical signals input to the pixels on the upper left of the border BO.

The offset of each reflected optical signal is related with external light apart from modulated light emitted by the light source 32 and with on/off of the light source 32. In other words, an image based on only offset of each reflected optical signal in the entire pixel array 22 includes position information of an object's shape formed according to external light conditions, as if it is photographed in black and white. This means that an object sensed by the pixels on the upper left of the border BO may be different from that sensed by the pixels on the lower right of the border BO. Therefore, when interpolation is performed using the pseudo 4-tap scheme according to embodiments of the inventive concept, a weight is applied to each of the pixel signals used for the interpolation according to the offset of a reflected optical signal.

According to the pseudo 4-tap scheme, the phase shift θ of the reflected optical signal RL(i,j) input to the pixel P(i,j) may be calculated using Equation 12:

$$\theta = \arctan\left(\frac{P_{3\pi/2} - P_{\pi/2}}{P_{i,j,\pi} - P_{i,j,0}}\right), \qquad (12)$$

where $P_{3/\pi2}$ is a result of interpolating $P_{i-1,j,\pi/2}$ and $P_{i-1,j,3\pi/2}$ and $P_{\pi/2}$ is a result of interpolating $P_{i+1,j,\pi/2}$ and $P_{i+1,j,3\pi/2}$. $P_{3\pi/2}$ and $P_{\pi/2}$ may be respectively calculated using Equations 13 and 14:

$$P_{\frac{3\pi}{2}} = \frac{1}{K}\sum P_{m,n,\frac{3\pi}{2}} f\left(\sqrt{(m-i)^2 + (n-j)^2}\right) g(B' - B1), \text{ and} \quad (13)$$

$$P_{\frac{\pi}{2}} = \frac{1}{K}\sum P_{m,n,\frac{\pi}{2}} f\left(\sqrt{(m-i)^2 + (n-j)^2}\right) g(B' - B1),$$

where K is the number of pixel signals used for the interpolation, "f" and "g" are weight functions, and $P_{m,n,3\pi/2}$ and $P_{m,n,\pi/2}$ are pixel signals used for the interpolation. The independent variable of the function "f" indicates the relative position of a depth pixel corresponding to $P_{m,n,3\pi/2}$ and $P_{m,n,\pi/2}$ and the pixel P(i,j). The independent variable of the function "g" indicates the difference between an offset B' (e.g., B2 or B3) of the reflected optical signal (e.g., RL(i−1,j) or RL(i+1,j)) input to the depth pixel corresponding to $P_{m,n,3\pi/2}$ and $P_{m,n,\pi/2}$ and the offset B of the reflected optical signal RL(i,j) input to the pixel P(i,j).

In the current case, $P_{3\pi/2}$ and $P_{\pi/2}$ may be respectively calculated using Equations 15 and 16:

$$P_{\frac{3\pi}{2}} = \frac{1}{2}\left(P_{i-1,j,\frac{3\pi}{2}} f(1)g(B2-B1) + P_{i+1,j,\frac{3\pi}{2}} f(1)g(B3-B1)\right), \quad (15)$$

and $$P_{\frac{\pi}{2}} = \frac{1}{2}\left(P_{i-1,j,\frac{\pi}{2}} f(1)g(B2-B1) + P_{i+1,j,\frac{\pi}{2}} f(1)g(B3-B1)\right). \quad (16)$$

Referring to FIG. 9A, it is assumed that the weight is 0.3 when the independent variable of the function "f" is 1. Referring to FIG. 9B, it is assumed that the weight is 1 when the independent variable of the function "g" is 0 and the weight is 0.2 when the independent variable of the function "g" is B2−B1. For instance, the function "f" and the function "g" may be Gaussian functions.

The pixel P(i−1,j) and the pixel P(i+1,j) have the same weights (e.g., f(1) and f(1)) according to the relative position therebetween but have different weights (e.g., g(B2−B1) and g(B3−B1)) according to an offset difference, i.e., position information of an object's shape formed according to external light conditions. That is, g(B2−B1)=0, and since the pixel P(i+1,j) is positioned at the same side as the pixel P(i,j) on the basis of the border BO, g(B3−B1)=g(0)=1. In other words, when the pixel signal of the pixel P(i,j) is interpolated, a weight for the pixel signal of the pixel P(i+1,j) is higher than that for the pixel signal of the pixel P(i−1,j). Accordingly, the interpolation is performed so that the object's shape is closer to an actual shape, and therefore, more accurate distance computation is possible.

According to the current embodiments of the inventive concept, the depth sensor 10 uses an offset of a pixel signal during the interpolation of the pixel signal, thereby enabling accurate distance information to be obtained.

Figure 10:
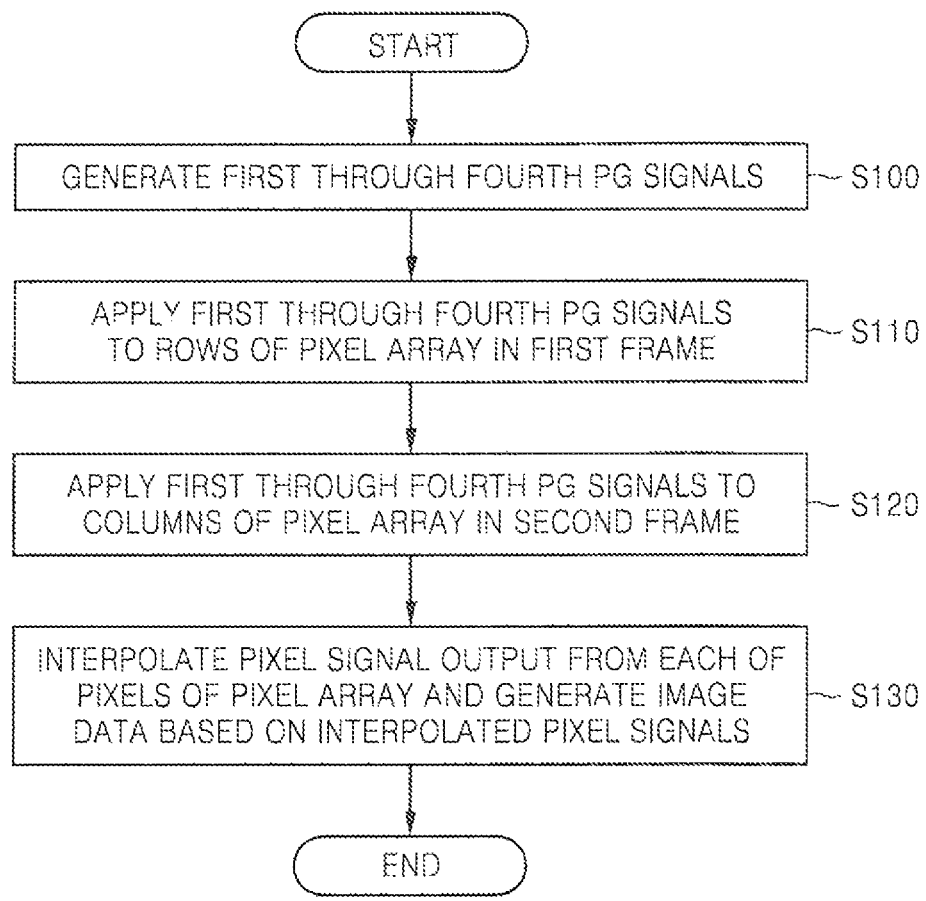
FIG. 10 is a flowchart of a method of operating the depth sensor illustrated in FIG. 1 according to some embodiments of the inventive concept.
Figure 11:
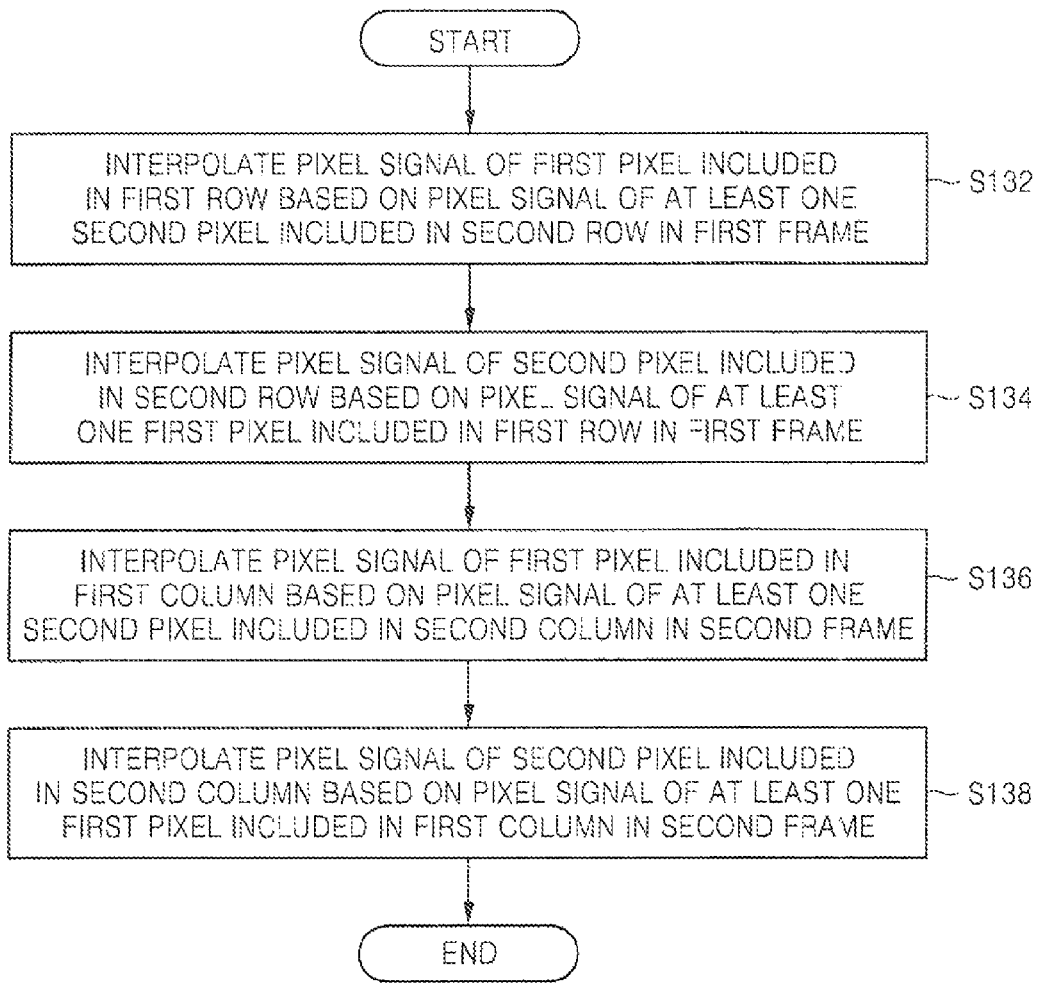
FIG. 11 is a detailed flowchart of an operation of interpolating pixel signals in the method illustrated in FIG. 10.

FIG. 10 is a flowchart of a method of operating the depth sensor 10 illustrated in FIG. 1 according to some embodiments of the inventive concept. FIG. 11 is a detailed flowchart of an operation of interpolating pixel signals in the method illustrated in FIG. 10.

Referring to FIGS. 1 through 11, the PG signal generator 53 may generate the first through fourth PG signals PGS1 through PGS4 based on the first clock signal CLK1 or the second clock signal CLK2 in operation S100. The row and column selector 54 may apply the first through fourth PG signals PGS1 through PGS4 to the rows of the pixel array 22 in a first frame according to the control of the frame index 52 in operation S110. The row and column selector 54 may apply the first through fourth PG signals PGS1 through PGS4 to the columns of the pixel array 22 in a second frame according to the control of the frame index 52 in operation S120.

The ISP 39 may interpolate a pixel signal output from each of the pixels 23 included in the pixel array 22 and generate image data based on interpolated pixel signals in operation S130. Operation S130 may include operations S132 through S138.

The ISP 39 may interpolate a pixel signal of a first pixel (e.g., the pixel P(i,j)) included in a first row (e.g., the i-th row in FIG. 7) based on a pixel signal of at least one second pixel (e.g., the pixel P(i−1,j)) included in a second row (e.g., the (i−1)-th row in FIG. 7) in the first frame in operation S132. At this time, a weight (e.g., the calculated value of a Gaussian function) corresponding to an offset (e.g., B2) is applied to the pixel signal of the at least one second pixel (e.g., the pixel P(i−1,j)).

The ISP 39 may interpolate the pixel signal of the second pixel (e.g., the pixel P(i−1,j)) included in the second row (e.g., the (i−1)-th row in FIG. 7) based on a pixel signal of at least one first pixel (e.g., the pixel P(i,j)) included in the first row (e.g., the i-th row in FIG. 7) in the first frame in operation S134. At this time, a weight (e.g., the calculated value of a Gaussian function) corresponding to an offset (e.g., B1) is applied to the pixel signal of the at least one first pixel (e.g., the pixel P(i,j)).

The ISP 39 may interpolate a pixel signal of a first pixel (e.g., the pixel P(i,j)) included in a first column (e.g., the j-th column in FIG. 7) based on a pixel signal of at least one second pixel (e.g., the pixel P(i,j−1)) included in a second column (e.g., the (j−1)-th column in FIG. 7) in the second frame in operation S136. At this time, a weight (e.g., the calculated value of a Gaussian function) corresponding to an offset (e.g., B2) is applied to the pixel signal of the at least one second pixel (e.g., the pixel P(i,j−1)).

The ISP 39 may interpolate the pixel signal of the second pixel (e.g., the pixel P(i,j−1)) included in the second column (e.g., the (j−1)-th column in FIG. 7) based on a pixel signal of at least one first pixel (e.g., the pixel P(i,j)) included in the first column (e.g., the j-th column in FIG. 7) in the second frame in operation S138. At this time, a weight (e.g., the calculated value of a Gaussian function) corresponding to an offset (e.g., B1) is applied to the pixel signal of the at least one first pixel (e.g., the pixel P(i,j)).

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

As described above, according to some embodiments of the inventive concept, a depth sensor differently applies a multi-frequency PG signal for each frame, thereby providing image data for which spatial resolution is not decreased, motion lagging is decreased and a measurable distance is increased. In addition, the depth sensor uses an offset of a pixel signal when interpolating the pixel signal, thereby obtaining accurate distance information.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of operating a depth sensor, the method comprising:
    generating a first photo gate signal and second through fourth photo gate signals respectively having 90-, 180- and 270-degree phase differences from the first photo gate signal;
    applying the first photo gate signal and the third photo gate signal to a first row of a pixel array and the second photo gate signal and the fourth photo gate signal to a second row adjacent to the first row in a first frame using a first clock signal; and
    applying the first photo gate signal and the third photo gate signal to a first column of the pixel array and the second photo gate signal and the fourth photo gate signal to a second column adjacent to the first column in a second frame using a second clock signal,
    wherein a frequency of the first clock signal is different from a frequency of the second clock signal.

2. The method of claim 1, further comprising:
    interpolating pixel signals output from respective pixels comprised in the pixel array; and
    generating image data based on interpolated pixel signals.

3. The method of claim 2, wherein the interpolating the pixel signals comprises:
    interpolating a pixel signal of a pixel in the first row based on a pixel signal of at least one pixel in the second row in the first frame; and
    interpolating a pixel signal of a pixel in the second row based on a pixel signal of at least one pixel in the first row in the first frame.

4. The method of claim 3, wherein the interpolating the pixel signal of the pixel in the first row based on the pixel signal of the at least one pixel in the second row comprises applying a weight corresponding to an offset of the at least one pixel in the second row to the pixel signal of the at least one pixel in the second row; and
    the interpolating the pixel signal of the pixel in the second row based on the pixel signal of the at least one pixel in the first row comprises applying a weight corresponding to an offset of the at least one pixel in the first row to the pixel signal of the at least one pixel in the first row.

5. The method of claim 4, wherein the weight is calculated based on a Gaussian function.

6. The method of claim 3, wherein the interpolating the pixel signals further comprises:
    interpolating a pixel signal of a pixel in the first column based on a pixel signal of at least one pixel in the second column in the second frame; and
    interpolating a pixel signal of a pixel in the second column based on a pixel signal of at least one pixel in the first column in the second frame.

7. The method of claim 6, wherein the interpolating the pixel signal of the pixel in the first column based on the pixel signal of the at least one pixel in the second column comprises applying a weight corresponding to an offset of the at least one pixel in the second column to the pixel signal of the at least one pixel in the second column; and
    the interpolating the pixel signal of the pixel in the second column based on the pixel signal of the at least one pixel in the first column comprises applying a weight corresponding to an offset of the at least one pixel in the first column to the pixel signal of the at least one pixel in the first column.

8. The method of claim 7, wherein the weight is calculated based on a Gaussian function.

9. A depth sensor comprising:
    a photo gate signal generator configured to generate a first photo gate signal and second through fourth photo gate signals respectively having 90-, 180- and 270-degree phase differences from the first photo gate signal; and
    a row and column selector configured to apply the first through fourth photo gate signals to rows or columns of a pixel array, the row and column selector being configured to apply the first photo gate signal and the third photo gate signal to a first row of the pixel array and the second photo gate signal and the fourth photo gate signal to a second row adjacent to the first row in a first frame using a first clock signal and being configured to apply the first photo gate signal and the third photo gate signal to a first column of the pixel array and the second photo gate signal and the fourth photo gate signal to a second column adjacent to the first column in a second frame using a second clock signal,
    wherein a frequency of the first clock signal is different from a frequency of the second clock signal.

10. The depth sensor of claim 9, further comprising an image signal processor configured to interpolate pixel signals output from respective pixels comprised in the pixel array and to generate image data based on interpolated pixel signals.

11. The depth sensor of claim 10, wherein the image signal processor is configured to interpolate a pixel signal of a pixel in the first row based on a pixel signal of at least one pixel in the second row in the first frame and is configured to interpolate the pixel signal of a pixel in the second row based on a pixel signal of at least one pixel in the first row in the first frame.

12. The depth sensor of claim 11, wherein the image signal processor is configured to apply a weight corresponding to an offset of the at least one pixel in the second row to the pixel signal of the at least one pixel in the second row when interpolating the pixel signal of the pixel in the first row based on the pixel signal of the at least one pixel in the second row and is configured to apply a weight corresponding to an offset of the at least one pixel in the first row to the pixel signal of the at least one pixel in the first row when interpolating the pixel signal of the pixel in the second row based on the pixel signal of the at least one pixel in the first row.

13. The depth sensor of claim 10, wherein the image signal processor is configured to interpolate a pixel signal of a pixel in the first column based on a pixel signal of at least one pixel in the second column in the second frame and is configured to interpolate a pixel signal of a pixel in the second column based on a pixel signal of at least one pixel in the first column in the second frame.

14. The depth sensor of claim 13, wherein the image signal processor is configured to apply a weight corresponding to an offset of the at least one pixel in the second column to the pixel signal of the at least one pixel in the second column when interpolating the pixel signal of the pixel in the first column based on the pixel signal of the at least one pixel in the second column and is configured to apply a weight corresponding to an offset of the at least one pixel in the first column to the pixel signal of the at least one pixel in the first column when interpolating the pixel signal of the pixel in the second column based on the pixel signal of the at least one pixel in the first column.

15. A method of operating a depth sensor, the method comprising:
   interpolating pixel signals output from pixels of first and second adjacent rows of a pixel array in a first frame, wherein the pixels of the first and second adjacent rows of the pixel array generate the pixel signals in response to an optical signal reflected from a scene;
   interpolating pixel signals output from pixels of first and second adjacent columns of the pixel array in a second frame, wherein the pixels of the first and second adjacent columns of the pixel array generate the pixel signals in response to an optical signal reflected from the scene, and wherein the pixel signals of the first frame are generated using a first clock signal and the pixel signals of the second frame are generated using a second clock signal different than the first clock signal; and
   generating image data based on the interpolated pixel signals,
   wherein the pixel signals of the first row are generated by a first pair of photo gate signals out of phase with each other and the pixel signals of the second row are generated by a second pair of photo gate signals out of phase with each other, and
   wherein the pixel signals of the first column are generated by the first pair of photo gate signals and the pixel signals of the second column are generated by the second pair of photo gate signals.

16. The method of claim 15, wherein the first pair of photo gate signals comprise first and third photo gate signals, and the second pair of photo gate signals comprise second and fourth photo gate signals, and
   wherein the second, third and fourth photo gate signals respectively have 90-, 180- and 270-degree phase differences from the first photo gate signal.

17. The method of claim 15, wherein the interpolating the pixel signals comprises:
   interpolating a pixel signal of a first pixel in the first row based on a pixel signal of a second pixel in the second row;
   interpolating the pixel signal of the second pixel in the second row based on the pixel signal of the first pixel in the first row;
   interpolating a pixel signal of a first pixel in the first column based on a pixel signal of a second pixel in the second column: and
   interpolating the pixel signal of the second pixel in the second column based on the pixel signal of the first pixel in the first column.

18. The method of claim 17, wherein the interpolating the pixel signal of the first pixel in the first row based on the pixel signal of the second pixel in the second row comprises applying a weight corresponding to a reflected signal offset of the second pixel to the pixel signal of the second pixel;
   the interpolating the pixel signal of the second pixel in the second row based on the pixel signal of the first pixel in the first row comprises applying a weight corresponding to a reflected signal offset of the first pixel to the pixel signal of the first pixel;
   the interpolating the pixel signal of the first pixel in the first column based on the pixel signal of the second pixel in the second column comprises applying a weight corresponding to a reflected signal offset of the second pixel to the pixel signal of the second pixel; and
   the interpolating the pixel signal of the second pixel in the second column based on the pixel signal of the first pixel in the first column comprises applying a weight corresponding to a reflected signal offset of the first pixel to the pixel signal of the first pixel.

19. The method of claim 15, wherein a frequency of the first clock signal is different from a frequency of the second clock signal.

* * * * *